Jan. 14, 1930.  R. C. SEYMOUR  1,743,490
FOLDING MECHANISM
Filed Sept. 23, 1924  10 Sheets-Sheet 1

INVENTOR
R.C. Seymour
BY
John Morgan
ATTORNEY

Jan. 14, 1930.  R. C. SEYMOUR  1,743,490
FOLDING MECHANISM
Filed Sept. 23, 1924   10 Sheets-Sheet 2

INVENTOR
R.C. Seymour
BY
John D. Morgan
ATTORNEY

Jan. 14, 1930.    R. C. SEYMOUR    1,743,490
FOLDING MECHANISM
Filed Sept. 23, 1924    10 Sheets-Sheet 3

Jan. 14, 1930. R. C. SEYMOUR 1,743,490
FOLDING MECHANISM
Filed Sept. 23, 1924 10 Sheets-Sheet 5

Jan. 14, 1930.  R. C. SEYMOUR  1,743,490
FOLDING MECHANISM
Filed Sept. 23, 1924   10 Sheets-Sheet 8

INVENTOR
R. C. Seymour
BY John D. Morgan
ATTORNEY

Patented Jan. 14, 1930

1,743,490

UNITED STATES PATENT OFFICE

RALPH C. SEYMOUR, OF SHORT HILLS, NEW JERSEY; MARY F. SEYMOUR EXECUTRIX OF SAID RALPH C. SEYMOUR, DECEASED

FOLDING MECHANISM

Application filed September 23, 1924. Serial No. 739,275.

The invention relates to folding machines, and more particularly to a novel folding mechanism adapted to operate with a web printing press and to give different kinds and sizes of fold as desired, although the folder is also adapted for use in other relations.

Objects and advantages of the invention will be set forth in part hereinafter, and in part will be obvious herefrom, or may be ascertained by practice with the invention; the same being realized and attained by means of the instrumentalities and combinations pointed out in the appended claims.

The invention consists of the novel parts, constructions, arrangements, combinations and improvements herein shown and described.

The accompanying drawings, herein referred to, and constituting a part hereof, illustrate one embodiment of the invention, and together with the description serve to illustrate the principles thereof.

Of the drawings:

Fig. 2ᵃ is a fragmentary section taken substantially on line 2ᵃ—2ᵃ of Fig. 2;

Fig. 6ᵃ is a full top plan, corresponding to Fig. 6;

Fig. 10 is an enlarged, broken plan taken substantially on the line 10—10 of Figs. 6 and 9;

The invention is directed to providing a novel and useful folding mechanism, and it is especially directed in certain of its aspects to providing such a mechanism to variously fold the product of a printing press, and more especially a web printing press. The invention finds one of its best and most useful adaptations and embodiments in the folding mechanism of a web printing press of the magazine or catalogue type.

The folder further finds one of its exceedingly useful and extensive adaptations and applications to a press, usually a rotary web press, whether of the magazine type or not, wherein the plates may be varied on the form cylinder so as to give page imprints of different sizes, or arranged along or across the web, or both, the folder being capacitated to give correspondingly various folds, or sizes, or both, to the product, and if desired signatures varying also in the number of pages. With these objects in view the invention provides a plurality of novel folding and delivering mechanisms which are alternatively operable, preferably in connection with sheet cutting and collecting mechanism.

The invention in accordance with certain of its features also provides improved mechanisms for speeding up the sheets or signatures and to deliver them with certainty in registered position for receiving a fold.

In certain of its features further, the invention is directed to delivery mechanism for receiving and packing the completely folded product in a novel and highly efficient manner, and so as to preserve the product in perfect and acceptable commercial condition.

Briefly describing preliminarily, for convenience, the general constructional features of the present preferred embodiment, and in connection with a rotary magazine press, rotary cutters will cut the sheets from the single or plicated perfected web, and they will be collected upon a collecting cylinder, or may be handled upon this cylinder singly as may be desired and arranged.

The sheet or collected sheets are delivered from the collecting cylinder by means of a folding jaw, which makes a transverse fold therein preferably centrally across the sheet or sheets. The path and manner of handling the sheet or sheets from this point is alternative, depending upon the kind of product desired, that is the size of page and the kind of fold; and these in turn will often depend upon the size, number and arrangement of the printing plates upon the form cylinders of the press.

The sheet or sheets, with the single transverse fold therein, are carried away in the grip of the folding jaw, and may be delivered to another cylinder or equivalent rotating member, which will optionally or alternatively either receive the once transversely folded sheet or sheets and pass it on to delivery, or if desired, will make a second transverse fold in the sheet or sheets. The first folding device just described is constructed for this purpose with a folding jaw and a folding blade on the same carrier, spaced apart half the length of the once-folded sheet. The folding blade will tuck the sheet in the folding jaws upon the second cylinder, when the second transverse fold is made; and alternatively the folding jaws on the first folding device deliver the sheet or sheets by the first transverse fold to the second cylinder without making a second fold therein. The sheet or sheets may be slit also if desired. Whichever the product, it goes from this cylinder to any kind of delivery mechanism.

As a further alternative handling of the sheet or sheets, they may be directed to the opposite side of the machine after the single transverse fold is made, and may be slit at one or at a plurality of points into a plurality of separated signatures, the once folded and slitted sheets being then run through a guillotine folder which puts a longitudinal fold into each of the split apart signatures. Further features of the delivery mechanism will be later set forth.

It will be understood that the foregoing general description, and the following full and detailed description are exemplary and explanatory of the invention, but are not restrictive thereof further than is required by the prior art. It will be understood also that certain objects and advantages of the invention will be set forth primarily hereinafter in connection with the detailed description of this present preferred embodiment.

Referring now in detail by way of example to the present preferred embodiment of the invention, illustrated in the accompanying drawings, means are shown for cutting a running single or plicated web (usually coming from a perfecting rotary press) into sheets, comprising preferably rotary cutters 1 and 2, having their shafts 3 and 4 journaled, respectively, in bearings 5 and 6 carried upon the machine frame. The free end of the web is directed downwardly through a channel-way, comprising two series of vertically-disposed, spaced-apart bars 7 and 8, carried upon supports 9 and 10, mounted upon the machine frame. The foregoing construction may be of any known or suitable form as found desirable.

Means are preferably provided for taking the web end or ends, just prior to the severance thereof into a sheet or sheets, and in accordance with certain features of the inventon this is a rotary, and optionally collecting mechanism, having devices for gripping the end of the sheet or sheets and also devices for cooperating in making a central transverse fold in the sheet or sheets, and either advancing them or feeding them off by this fold. For convenience this and other rotary devices will be termed cylinders, although it will be understood that this will cover skeleton or other constructions as well as those of actual cylinder form.

In this present embodiment a cylinder 11 is provided (Fig. 1), which as embodied has four sets of grippers 13, adapted to take the end of the sheet or sheets, as already described as they emerge from the guideway below the rotary cutters. Tucking discs 14 cooperate in bringing to and maintaining the ends of the sheets in cooperative relation with cylinder 11.

The gripper mechanism may be of any known or other suitable form, and is shown merely conventionally in the drawing. Such a mechanism usually comprises a series of gripper fingers, which are resiliently held closed or in gripping position through the action of one or more springs, the grippers being mounted on a common actuating shaft journaled in the cylinder, this shaft having an arm or arms provided with cam rollers, which cooperate with a stationary cam or cams upon the machine frame. Thus the grippers are closed upon the sheet end at the proper time and again opened to release the sheet or sheets as they are folded off.

The cylinder 11 is provided also with four folding blades 15, mounted upon and spaced about cylinder 11 so as to make a transverse fold centrally of the length of the sheet in cooperation with suitable cooperating folding devices. As embodied this comprises a traveling folding jaw which in addition to making the cross fold carries the sheet or group of sheets away from the cylinder. These folding blades are preferably circumferentially adjustable in their mountings upon the cylinder, and as embodied are shown with a series of set screws 16 and 17 at either side of supporting block 18 in which the folding blade is mounted.

Cooperating with the mechanism just described is a traveling mechanism, likewise preferably rotary, having a folding jaw cooperating successively with the respective folding blade 15 to make the central crossfold in the sheet or group of sheets, and to carry it away and on through the machine. As embodied (Figs. 1, 2 and 2ª) a folding jaw mechanism 20 has a fixed jaw 21 and an opening and closing jaw 22, consisting of a single jaw or series of fingers. The entire folding jaw has rotary movement about a center to properly position the jaw in taking the sheet while making the fold, and in delivering it by the fold. As embodied, fixed jaw 21 is integral with, or mounted in fixed position on, a pair of arms 23 and 24, which arms have at either end short shafts 25 and 26 journaled in a pair of arms 27 and 28. These arms are fixed on a shaft 29, which shaft is journaled at 30 and 31 on the machine frame. Shaft 29 is driven by suitable gearing 32. A suitable counter weight 33 is preferably provided, carried by extensions of arms 27 and 28 on the other side of shaft 29. The folding jaw mechanism is preferably separately mounted on the arms 27 and 28 in an arcuate seat, and is held in place by suitable means, such as tap bolts 34.

Means are provided for opening and closing movable gripper jaw 22, and as embodied this jaw, or series of gripper fingers corresponding to a jaw, is fixed to a shaft 35, journaled in arms 23 and 24. The shaft 35 extends outwardly at either end from its bearings in the arms 23 and 24, and also through arcuate slots 36 and 37 formed in arms 27 and 28, these slots being necessary for the rotary motion of the entire folding jaw in taking and delivering sheets.

Fixed to either end of shaft 35 are arms 38 and 39, carrying respectively cam rollers 40 and 41. Cam roller 40 cooperates with a fixed cam 42, carried on a bracket 43, mounted on the side frame of the machine, and cam roller 41 cooperates with a cam 44, mounted on a bracket 45, carried by plate 55 of the mechanism for actuating the entire folding jaw and later to be described. By means of cams 42 and 44, the gripper jaw 22 is opened to receive the sheet or sheets and closes on them to make the fold and again is opened to release the sheets at delivery.

The gripper jaw 22 is normally held in closed position by suitable mechanism, and as embodied, a rod 46 is pivotally mounted on arm 38, and is slidable in an aperture in a lug 47, fixed to an arm 48, which arm is fixed to shaft 25 of the gripper mechanism. A helical spring 49 is coiled about the rod 46, and is in compression between lug 47 and a collar 50 fixed in adjustable position on the rod 46.

The embodied form of means for rotating the folding jaw mechanism, to properly position it for making the fold and for delivering the sheet, comprises an arm 52 fixed to the shaft 26, and carrying a cam roller 53 running in a box cam 54, formed in a plate 55. The plate 55 is carried on screw bolts 56 and 57 screwed into the machine frame, and cooperating therewith are long spacing collars 58 and 59. The requisite motion of the folding jaw mechanism is effected by the mechanism just described, the jaw swinging to and fro in the slots 36 and 37.

Figure 1:
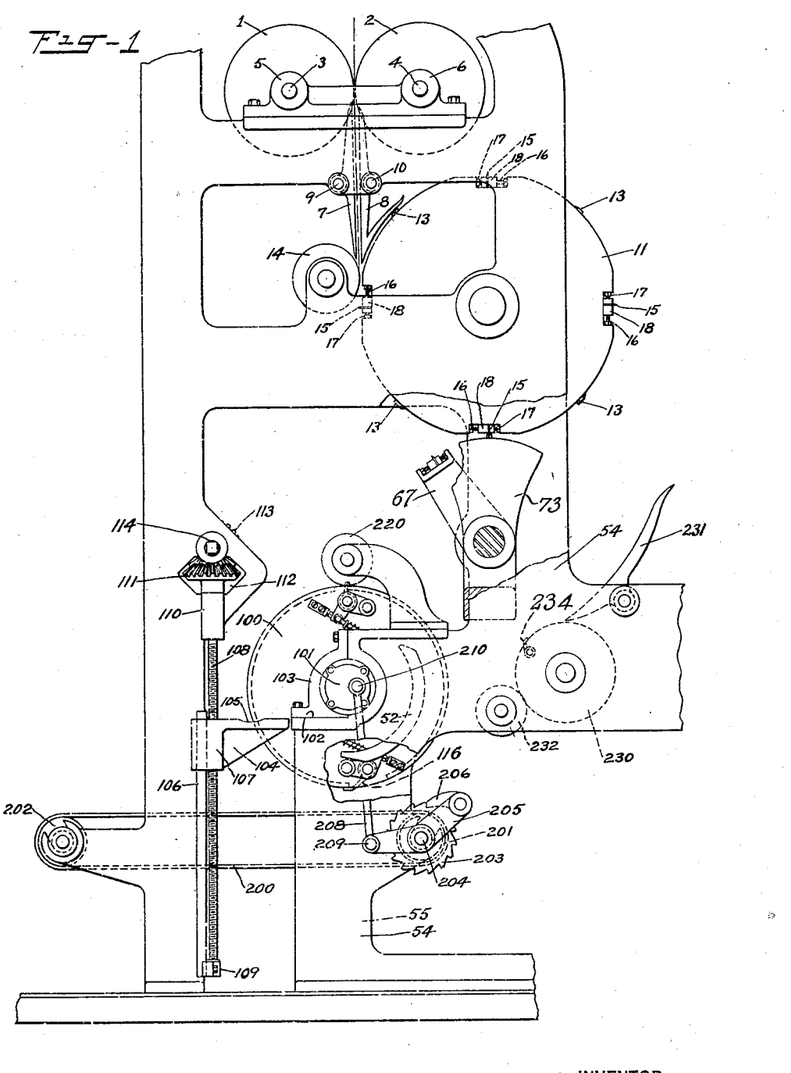
Fig. 1 is a fragmentary elevation of a machine embodying the invention.
Figures 2, 2A:
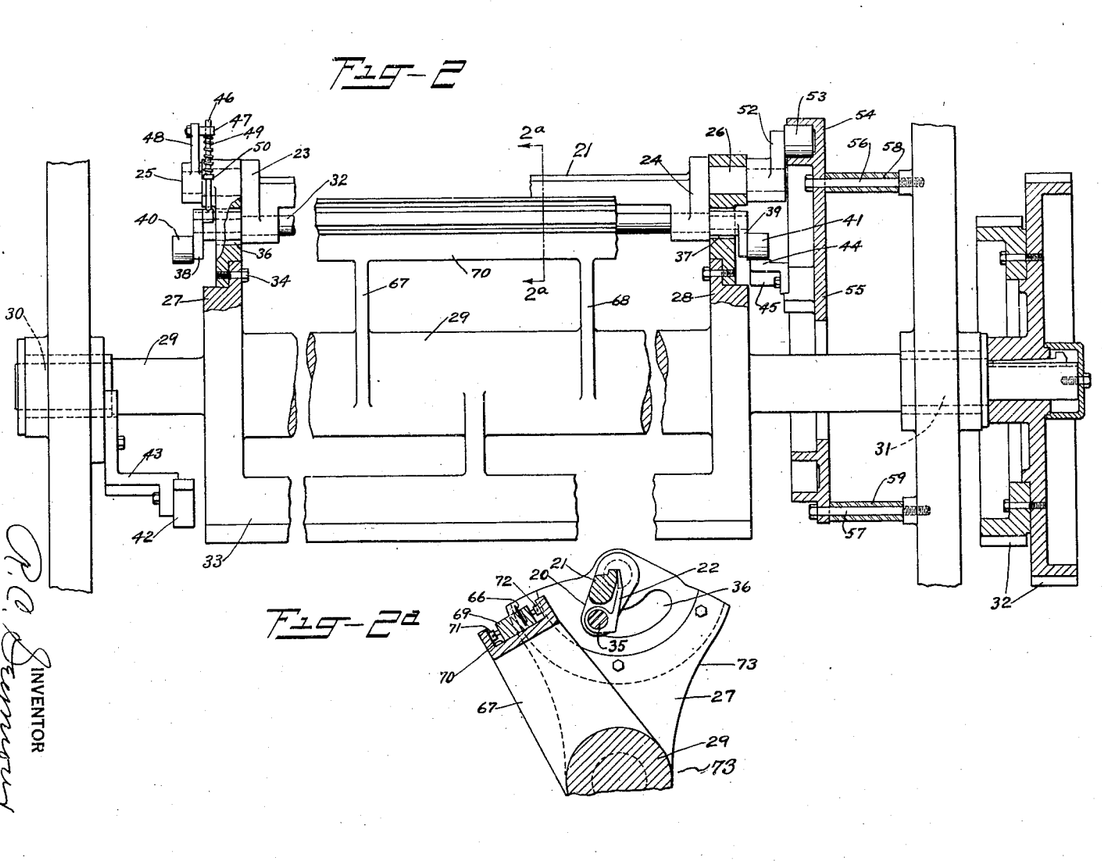
Fig. 2 is an enlarged, fragmentary side elevation of the mechanism for making the first fold.

Means are provided, as previously indicated, for alternatively delivering the sheets from the folding mechanism 20 by making a second transverse fold therein, instead of delivering the sheet directly from the jaws 20 with only one transverse fold therein. As embodied, this mechanism includes a folding blade 66, which is adjustably mounted to vary the location of the fold, as for sheets of different sizes. The folding blade 66 is mounted on arms 67 and 68, and as embodied, the adjustment of the blade 66 is effected between the blade and the arm, although it could be otherwise provided. For this purpose, the blade 66 is mounted in a block 69, carried in a seat 70, carried by the arms 67 and 68. Positioning screws 71 and 72 are mounted at either side of the block, and thereby the position of the blade 66 may be varied as desired. This mechanism is indicated generally by 73 (Figs. 1 and 2ª).

Figure 5:
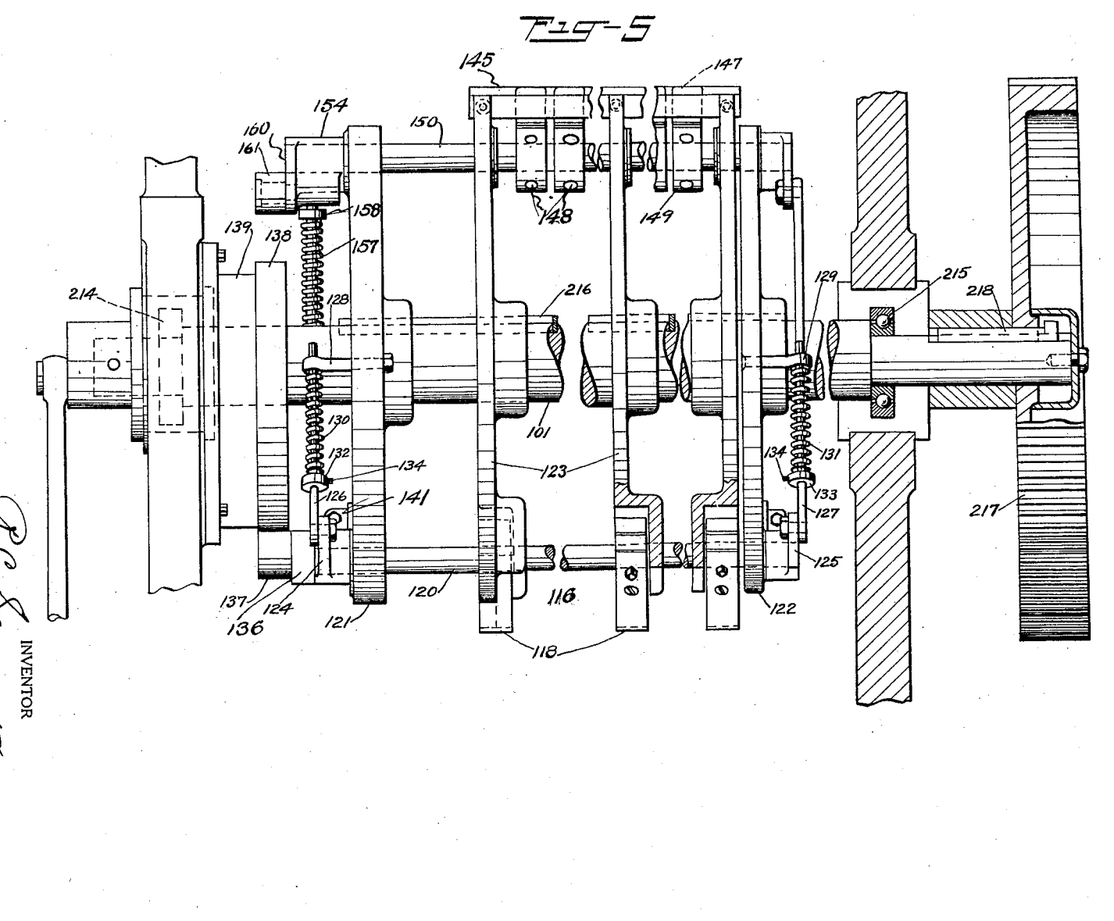
Fig. 5 is a broken, enlarged elevation, looking at Fig. 3 from the right, and showing certain parts in section.

In accordance with one feature of the invention, the cooperating mechanism may be entirely silent and preferably also may be removed from its operative position in the machine. For this purpose, as embodied (Figs. 1 and 5), the shaft 101 of a cylinder 100 is mounted in bearings each having a horizontal or level reach 102 in the respective side frames of the press. A bolted cap plate 103 at either side retains the cylinder shaft in its bearings and the cylinder in operative relation with respect to the preceding mechanism.

Cooperating therewith are a pair of supports 104, at either side of the machine and in alignment transversely with the bearings of the shaft 101 of the cylinder or equivalent member 100. The supports 104 have depressions 105 wherein the cylinder shaft 101 rests to retain the cylinder in inoperative position. The respective supports 104 are mounted to travel vertically on corresponding guides 106, formed on or carried by, the machine side frames respectively.

The supports 104 have also hubs 107, provided with screw-threaded apertures in which work screw rods 108, journaled and supported on the machine frames by bearing supports 109 and 110. At their top ends the screw rods 108 have fixed thereto corresponding bevel gears 111, which project inwardly from either side through openings 112 in the machine frame. Within the side frames of the machine the bevel gears 111, at either side, mesh with corresponding bevel gears 113 fixed on a shaft 114, which shaft is squared at its end. By placing a crank or cranks on the squared head or heads of shaft 114, the screw rods 108 may be rotated together to raise or lower the cylinder supports 104. Thus the cylinder 100 can be raised to or lowered from the level or point at which it was rolled on to the supports 104 from its bearings 102, and vice versa.

Figure 3:
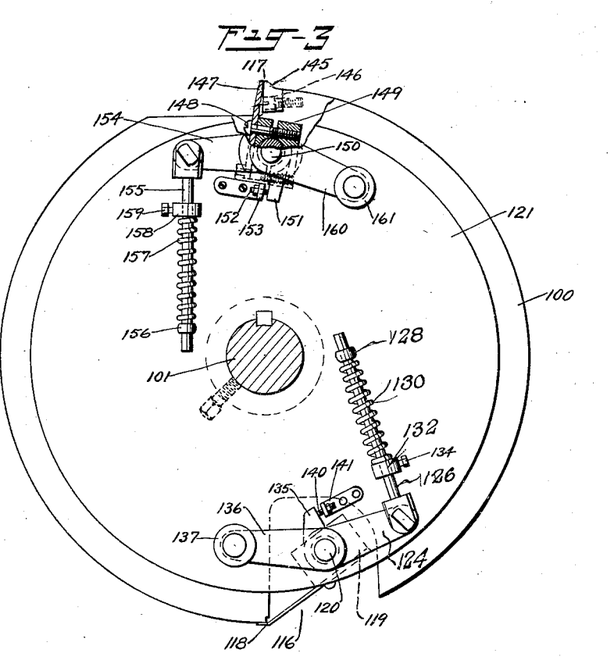
Fig. 3 is a detached detail in end elevation of the folding mechanism shown at the lower left hand part of Fig. 1.

Referring now to the cylinder 100 in connection with its function of taking the sheet or group of sheets from the folding mechanism previously described, either with or without making an additional fold therein (which functions are independent of the removability of the cylinder from operative relation with respect to the folding mechanism), the cylinder is provided with a gripper mechanism 116 (Figs. 1, 3 and 5), which cooperates with the folding mechanism 20 to take the sheet without further transverse folding and is provided also with a folding jaw mechanism 117, which operates alternatively with the gripper mechanism 116 and takes the sheet or group of sheets from the folding blade 66 by making a second transverse fold therein.

The gripper mechanism may be of any suitable form, and as shown comprises a plurality of separated gripping fingers 118, fixed detachably to supporting blocks 119, respectively, which blocks are fixed to a shaft 120 to rock therewith to effect the opening and closing of the grippers, the shaft being rotatively journaled in heads 121 and 122 and in intermediate supporting members 123.

The actuating mechanism for the grippers comprises arms 124 and 125, fixed to the shaft 120 at either end thereof outside of the cylinder heads 121 and 122. Pivotally connected to the ends of the arms 124 and 125, respectively, are rods 126 and 127, the other ends of these rods projecting through apertures in supporting lugs 128 and 129, respectively, and being freely longitudinally movable therewithin. Helical springs 130 and 131 encircle the rods 126 and 127, respectively, and are in compression between the corresponding lugs 128 and 129 and collars 132 and 133, which may be variably fixed in position along the rod, to adjust the tension of the spring, these collars having clamping screws 134 for this purpose. This mechanism tends to resiliently maintain the grippers in closed position. The grippers may be adjusted by means of a lug 135 fixed on shaft 120, which cooperates with a screw 140 threaded in a bracket 141, fixed on the head 121.

The automatically operated gripper-opening means, as embodied, comprises an arm 136 fixed to shaft 120, outside of the head 121, and having a cam roller 137 journaled on the end thereof. This cam roller cooperates with a cam 138, mounted upon a suitable supporting structure 139, mounted on the machine side frame. Thus the grippers are opened and then permitted to snap to upon the sheet ends, and are again opened at the proper time to release the sheets.

Referring now to the illustrated and embodied form of the alternatively operated folding mechanism, a folding jaw 145 is adjustably mounted upon the cylinder 100, the adjusting means comprising preferably a plurality of adjusting screws 146. A cooperating moving folding jaw comprises a plurality of separated fingers 147, detachably fixed, preferably by clamping screw 148, to corresponding split blocks 149. These blocks are clamped by the same screws in fixed position to an actuating shaft 150 to oscillate therewith, to effect the opening and closing action of the folding jaws. An adjustable stop mechanism may be provided, if desired, and as embodied (Fig. 3) one of the split blocks 149 has a tail 151, adapted when the folding jaw is closed to abut against an adjusting screw 152, carried in a bracket 153, and there is preferably one of these mechanisms at either end of the cylinder 100.

Means are provided for resiliently maintaining the folding jaw in a closed position, and in the embodied form thereof (Figs. 3 and 5) an arm 154 is fixed to the shaft 150 exteriorly to the cylinder head 121, and pivotally connected to the end of the arm is a rod 155, mounted and longitudinally movable within an apertured lug 156 in head 121. A helical spring 157 encircles the rod 155 and is in compression between the lug 156 and a collar 158, adjustably fixed upon the rod 155 by a clamping screw 159, thereby regulating the pressure of the spring on the folding jaw to resiliently maintain same in closed position.

The means for periodically opening the folding jaw comprises an arm 160, fixed to shaft 150, and having a cam roller 161, journaled on the end thereof. This cam roller cooperates with the cam 138 to open the gripper and to permit it to close at the proper time.

Suitable delivery mechanism is provided, and as shown herein (Fig. 1) an endless delivery belt 200 runs at either end over rollers 201 and 202, mounted on the machine frame, and are preferably removably journaled therein, as shown. An intermittent feed is preferably provided, and as shown a ratchet wheel 203 is fixed to the shaft 204 of the driving roller 201 for the delivery belt. A lever 205 is loosely mounted upon the shaft 204, and pivoted thereon is a pawl 206, cooperating with the ratchet wheel 203. The pawl lever is actuated by a rod 208, pivoted to the tail of the lever at 209 and pivotally and eccentrically mounted on the shaft 101 of the cylinder 100.

Shaft 101 of cylinder 100 (Fig. 5) is provided preferably with ball bearings 214 and 215 in the side frames of the machine. The heads and supporting members 121 and 122 and 123 are held in fixed position on the cylinder by means of a key 216. A driving gear 217 is fixed to the exterior end of the shaft outside of the side frame by means of a key 218.

One or more rotary slitters 220 may be used in connection with this cylinder, or equivalent member, to cut the signatures apart across the sheet or sheets, and such a slitter is shown in Fig. 1 of the drawing.

Figure 4:
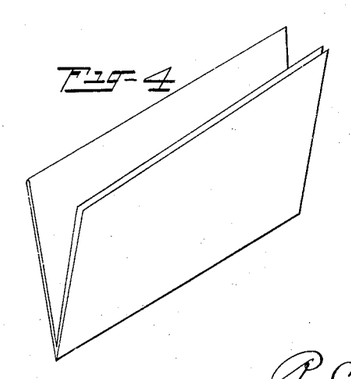
Fig. 4 is a diagrammatic representation of the product as delivered from the mechanism shown in Fig. 3.

Thus this mechanism will deliver a sheet or group of sheets with one cross fold therein, or with two cross folds therein (as shown in Fig. 4), and will separate a sheet into two or more signatures transversely of the cylinder; or this entire mechanism may be moved to inoperative position in the machine or may be removed entirely from the machine. The conveyor belt or other conveying mechanism may be removed prior to putting the cylinder 100 out of operation.

Referring now to the remaining folding mechanism (Figs. 1 and 6), which may be used alternatively with that previously described, a gripper cylinder, or equivalent structure 230 is adapted to take the sheets with the one cross fold therein from the folding mechanism 20, a plurality of supporting fingers 231 being preferably utilized to guide the sheet onto the cylinder. Cylinder 230 is provided with suitable sheet taking and releasing grippers 234, having actuating mechanism of any suitable form and indicated generally as 235.

Figure 6:
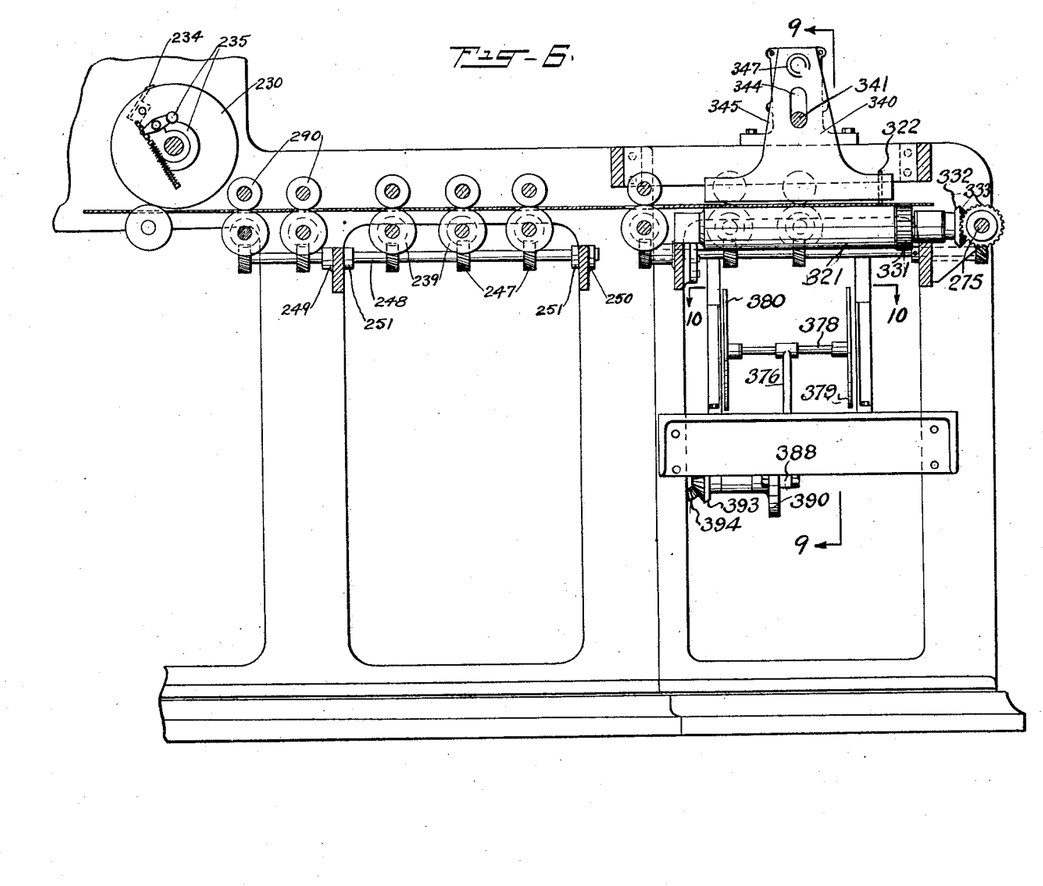
Fig. 6 is a central, vertical, longitudinal section taken on the line 6—6 of Fig. 7, and extends from the broken off parts at the lower right-hand part of Fig. 1.
Figure 6A:
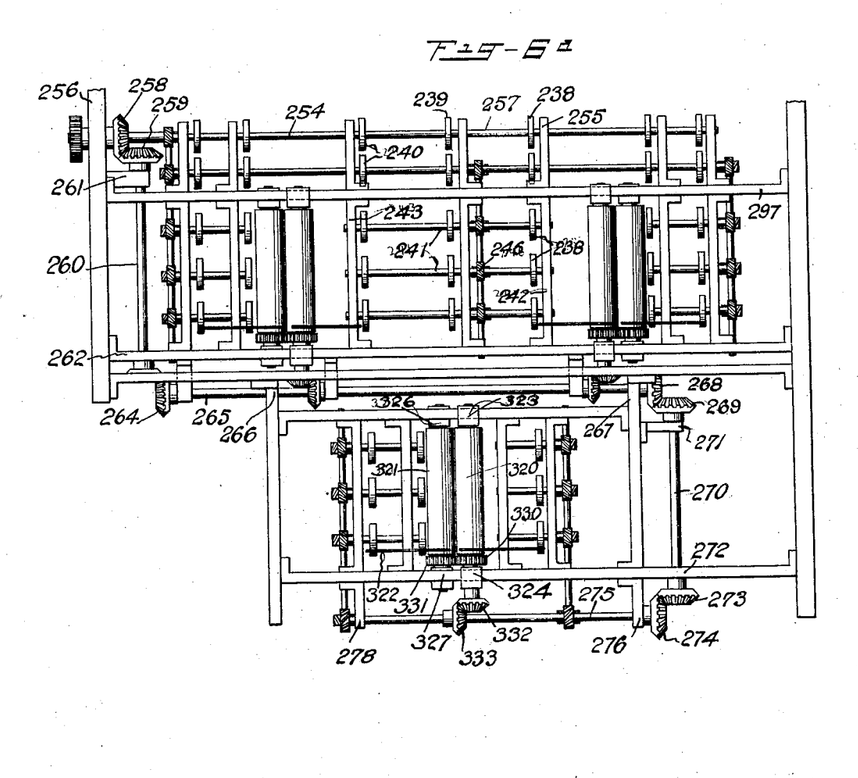

A slitter or slitters 232 may cooperate with the gripper cylinder 230 to separate the folded sheet or sheets into two or more sheets or groups transversely of the cylinder 230. In the illustrated embodiment, two slitters 232 are used, and the sheet or sheets are cut into three groups and these are forwarded (Figs. 1, 6 and 6ª) to three folders and are folded and delivered. To afford convenient room for the delivery mechanism for the central folder, this is arranged ahead or beyond the other two, as is best shown in Fig. 6ª. The detailed description of one forwarding, folding and delivering or packing mechanism will suffice for all.

In the present embodiment, the sheet or group of sheets, with one cross fold therein, is slitted into three sheets or groups, is conveyed away along a flat path and is then flat folded longitudinally. In the embodied form, the sheet forwarding means (Figs. 6, 6ª, 7, 8 and 9) comprises a plurality of sets conveying rollers acting upon the flat and folded sheet or sheets from beneath. These rollers are arranged in successive sets along the pathway of the sheets, there being a plurality of rollers in each set, preferably three, 238, 239 and 240.

Each set of rollers is fixed upon a shaft 241, journaled in side frames 242 and 243 of the machine. These rollers are driven in a suitable manner, and as embodied, there is fixed upon their respective shafts spiral gear pinions 246, which mesh respectively with spiral gear pinions 247. Gear pinions 247 are fixed on a shaft 248, journaled at 249 and 250 in the machine frame, and held from longitudinal displacement by collars 251, fixed to the shaft at either side of its bearings.

Shaft 248 is in turn driven from a shaft 254, journaled at 255 and 256 in the machine frame. A spiral gear pinion 257, fixed on shaft 255, meshes with one of the spiral gear pinions 247 to drive the feeding rollers. Fixed on shaft 254 is a bevel pinion 258, which meshes with a bevel pinion 259 on a shaft 260, journaled at 261 and 262 in the machine frame. Fixed also to shaft 260 is a bevel pinion 263, which meshes with a bevel pinion 264, fixed on a shaft 265, mounted at 266 and 267 in the machine frame.

Fixed on shaft 265 is a bevel gear 268, which meshes with a gear 269, fixed on a shaft 270, journaled at 271 and 272 in the machine frame. Fixed on shaft 270 is a bevel pinion 273, which meshes with a bevel pinion 274, fixed on a shaft 275, journaled at 276, 277 and 278 in the machine frame. Certain parts are driven from these various shafts, as will be later described, and the common drive may be located at any convenient place and may be on the shaft 254. Certain of the feeding rollers 239 are journaled directly on the shaft 265, as a matter of convenience, as will be seen from Fig. 7.

In accordance with one feature of the invention, the successive sets of feed rollers increase slightly in diameter and circumference from the receiving end toward the delivery or folding end, whereby they act to keep the sheets smooth and taut as they are fed forward and will present them absolutely flat and smooth at the folding position.

The embodied form of means cooperating with the rollers 238, 239 and 240 to forward the sheets, comprises loose friction rollers 290 and 291, resting upon the tops of the sheets above the corresponding driven rollers 238, 239 and 240, which are beneath the sheets. These rollers are journaled, respectively, in arms 292 and 293, which arms are independently pivoted in blocks 294, carried upon cross rods 295. Thus the rollers have a common mounting, but their feeding action on the sheets is independent. The rods 295 are supported in any suitable manner, and for this purpose bracket arms 296 are fixed to, and extend outwardly from, cross frame members 297, the exterior ends of the bracket arms 296 having apertured bearings 298, through which the rods 295 pass to be supported thereby. Supporting plates 299 (Fig. 8) for the sheets between the driven feeding rollers may also be provided if desired.

The embodied form of folding mechanism is of the folding blade and roller type, and the description of one such mechanism will suffice. A pair of folding rollers 320 and 321 (Figs. 6, 6a, 7 and 9) are provided at the end of the path of travel of the sheets, and a stop 322, which positions the sheet or sheets for folding, is located in cooperative relation therewith.

Folding roller 320 is journaled at 323 and 324 in the machine frame, and folding roller 321 is journaled at 326 and 327 in the machine frame. The rollers are driven together in the usual manner by intermeshing pinions 330 and 331, fixed to the respective rollers. The rollers are driven by means of a bevel gear wheel 332 fixed on the shaft of folding roller 320, which bevel gear meshes with a bevel gear 333, fixed on shaft 275, previously described. The other folding rollers are also driven by similar mechanism.

A reciprocating folding blade 340 tucks the sheet or sheets into the bite of the folding rollers. The embodied actuating means therefor comprises a shaft 341, journaled in bearings 342 mounted upon the machine frame. The shaft projects through a slot 344 in the upwardly extending part 345 of the folding blade, the part 348 acting as a guide for the blade. Fixed on the shaft is a disk cam 346, having a cam track therein and a cam roller 347 is journaled upon the upper part of the folding blade and travels in the cam track. Thus, as the disk 346 rotates with its shaft 341, the folding blade is reciprocated to effect the fold.

The embodied form of sheet delivering and packing means (Figs. 6 and 9 to 12) comprises a receiving or packing box, and means engaging the ends of the folded signatures for gradually traveling the folded and delivered signatures along the packing box, proportionately to the feeding in of new folded signatures. As embodied, (Figs. 9 and 10, 11 and 12), a signature packing box is provided having vertically-disposed longitudinally-extending sides 350 and 351, supported upon a bed plate 352. The two sides are laterally adjustable to accommodate variations in the width or length of the signatures, and for this purpose the sides are provided, respectively, with horizontally-disposed base plates 353 and 354, (Fig. 10), which have bolt and slot connections 355 with the bed plate 352.

Each of the side walls 350 and 351 of the packing box is provided with a broad endless belt 356, the width of the belt preferably taking up most of the height of the side of the box and extending for the entire length of the box which is to be occupied by the signatures. Each endless belt 356 passes over an idle roller 357, having its shaft 358 journaled in the side plate near the forward end of the box and over a driven roller 360 having its shaft 361 journaled in bearings 359 mounted on the side plates near the rear end of the packing box.

Suitable guides 362 and 363 are provided beneath the folding rollers for guiding the folded signatures downwardly into operative relation at the front end of the box. Tension rollers 336 may be provided, acting on belts 356. These rollers are journaled on levers 337, pivoted at 338, and acted on by the tension springs 339.

Means are provided by the invention for engaging each newly folded signature and bringing it into cooperating relation with the mechanism for proportionately traveling the entire group of signatures along and within the packing box by engagement with the ends thereof. As embodied, a pair of guiding rods 370 and 371 are longitudinally disposed beneath the bed plate 352, and are supported at either end in brackets 373 and 374, which are mounted upon the machine frame. Mounted upon the guide rods 370 and 371, and reciprocable in a short path therealong, is a carriage 375, having fixed thereto a bracket 376, the bracket projecting upwardly through a slot 377 in the bed plate 352.

Carried by the upper end of the bracket 376 is a rod 378, extending transversely, and being a little less in length than the width of the packing box. Fixed to either end of the rod 378 are pusher fingers 379 and 380, adapted to engage the successively delivered folded signatures at either end thereof and to push them gently until their ends are in engagement with the intermittently traveling endless belts 356.

Suitable means are provided for reciprocating the mechanism just described, and as embodied, a connecting rod 385 is pivotally connected at 386 to a lug formed on the bottom of the carriage 375, the connecting rod being preferably provided with a turn buckle adjustment 387. At its opposite end 388, the connecting rod is pivotally connected to a crank disc 390, which is fixed on a shaft 391. The shaft is journaled in a bearing bracket 392, supported by, and extending downwardly from, the bed plate 352. A bevel gear 393 is fixed on shaft 391 and meshes with a bevel gear 394, fixed on a driving shaft 395. The pusher fingers 379 and 380 are thus reciprocated in the manner and for the purpose already described.

The embodied form of means for intermittently and proportionately traveling the endless belts 356 comprises a ball clutch mechanism 396, fixed to the bottom end of either shaft 361, for the respective driving rollers 360 of the two endless belts 356. Each of these clutch mechanisms has an actuating lever 397, extending inwardly and toward each other beneath the bed plate 352, the ends of the two levers overlapping, and being in contact, as shown in Fig. 10. Tension springs 398 act to restore the clutches to initial position after each feeding movement.

The means for proportionately operating the clutches and thereby proportionately moving the feeding belts 356 comprises an actuating rod 399, fixed to the underside of the carriage 375 at 400, and extending horizontally therefrom with its free end in contact with one of the clutch-actuating levers 397. Thus when the feeding fingers are actuated to press each newly-folded signature into the packing box, the entire group of signatures already in the packing box is fed forward an equal amount by the two feeding belts 356, which are in engagement with the edges of the group of signatures.

In operation, the running single or plicated web, which usually comes from a perfecting rotary press, is delivered to the rotary cutters 1 and 2, for the purpose of being cut into sheets, the free end of the web being directed downwardly through the channel way guide bars 7 and 8. The sheet or sheets are then delivered to the rotary collecting cylinder 11, whose grippers 13 take the end of the sheet or sheets as they emerge from the guide bars 7 and 8, the tucking discs 14 operating to bring and maintain the ends of the sheets in cooperative relation with the cylinder 11. The gripper mechanism, which may be of any suitable form, closes upon the sheet and releases it at the proper time. The folding blades 15 make a transverse fold centrally of the length of the sheet, in cooperation with the traveling folding jaw mechanism 20, which latter, in addition to making the cross fold, carries the sheets away from the cylinder 11, the cams 42 and 44 causing the gripper jaw 22 to open to receive the sheet or sheets, close on them to make the fold, and open again to release the sheets at delivery. The folding jaw mechanism is rotated by the arm 52, cam roller 53 and cam 54, to properly position it for making the fold and for delivering the sheet, the jaw swinging to and fro in the slots 36 and 37.

Instead of delivering the sheet directly from the jaws 20 with only one transverse fold therein, the sheet or sheets may be delivered with a second transverse fold therein produced by the folding blade 66, which can be adjusted to vary the location of the fold, as for sheets of different sizes.

By means of the raising and lowering supports 104, the cylinder 100 and its cooperating mechanism may be used or not, in the operation of the invention, as may be desired. Its function, when used, is to take the sheet or group of sheets from the folding mechanism above referred to, making or not making, as may be desired, an additional fold therein. The gripper mechanism 116 of the cylinder cooperates with the folding mechanism 20 to take the sheet without further transverse folding, the folding jaw mechanism 117 operating alternatively with the gripper mechanism 116 and taking the sheet or group of sheets from the folding blade 66 by making a second transverse fold therein. The gripping fingers 118 of the gripping mechanism 116 are rocked with the shaft 120 to effect opening and closing of the grippers 118, the shaft 120 being rocked for this purpose by the arm 136, cam roller 137 and cam 138.

The alternatively operable folding jaw mechanism 117, which includes the adjustable jaw 145 and moving folding jaws 147 (the latter being operated through the oscillating shaft 150), takes the sheet or sheets from the folding blade 66 and makes a second transverse fold therein.

One or more of the rotary slitters 220 may be used in connection with the cylinder 100, for the purpose of cutting the signatures apart across the sheet or sheets.

From the cylinder 100, the sheet or sheets are delivered to the delivery belt 200, which is intermittently operated through the ratchet wheel 203.

Figure 7:
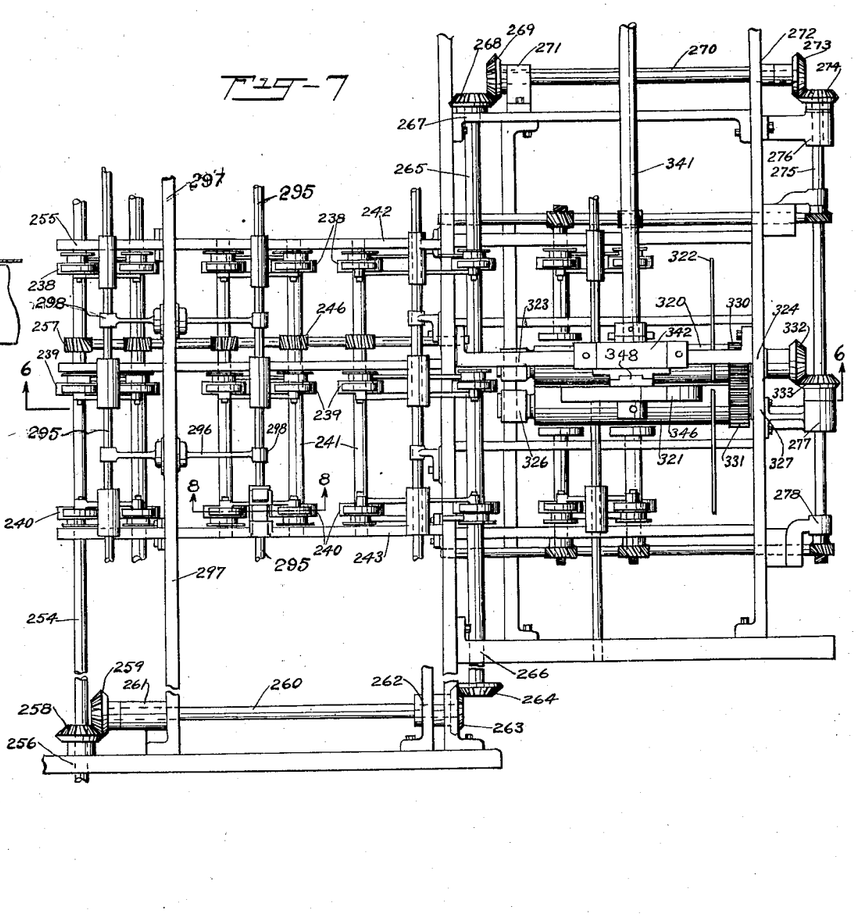
Fig. 7 is a fragmentary top plan corresponding to Fig. 6 and the central part of Fig. 6ᵃ.
Figure 8:
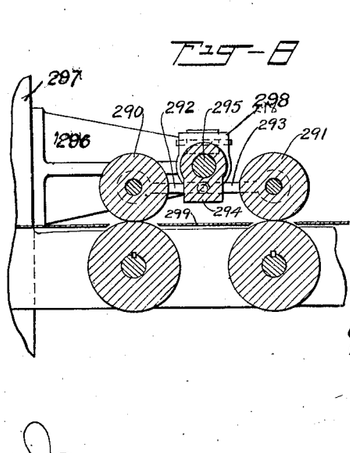
Fig. 8 is an enlarged detail in vertical section taken substantially on the line 8—8 of Fig. 7.

The foregoing mechanism will thus, as hereinabove described, deliver a sheet or group of sheets with one cross fold therein, or with two cross folds therein, and will separate a sheet into two or more signatures transversely of the cylinder; or this part of the mechanism may be moved to inoperative position in the machine, or may be removed entirely from the machine. The conveyor belt may, as herein described, be removed prior to the moving of the cylinder 100.

Where the remaining folding mechanism is used alternatively with that already described, the gripper cylinder 230 (Fig. 1) takes the sheets with the one cross fold therein from the folding mechanism 20, the supporting fingers 231 guiding the sheet onto the cylinder, with which may cooperate, if desired, one or more of the slitters 232. In the form of the invention illustrated by way of example, two slitters 232 are used, which cut the sheet or sheets into three groups, which are forwarded to folding and delivery mechanism (Figs. 6ª and 7).

The central group is forwarded to the folding mechanism of Fig. 7, which, as shown in Fig. 6ª, is arranged beyond the two lateral folding mechanisms, to afford convenient room for the delivery mechanism of the central folder. As the progress of each group of sheets is the same, the operation of the central group mechanism only will be described.

Figure 9:
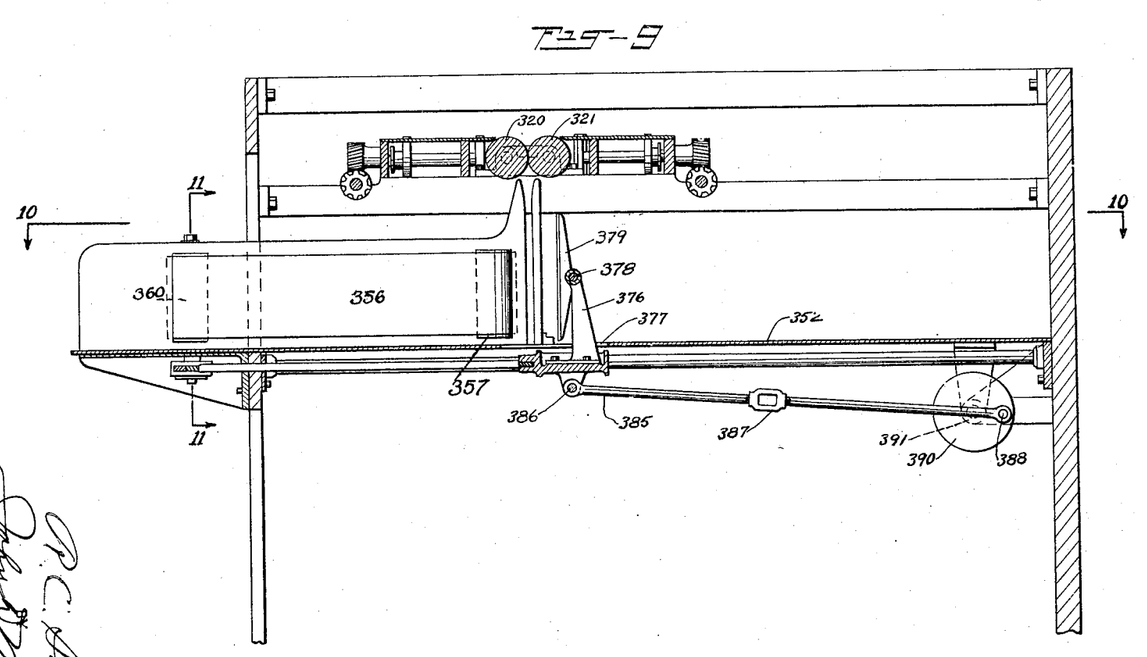
Fig. 9 is an enlarged vertical section taken on the line 9—9 of Fig. 6 with certain parts omitted.
Figure 11:
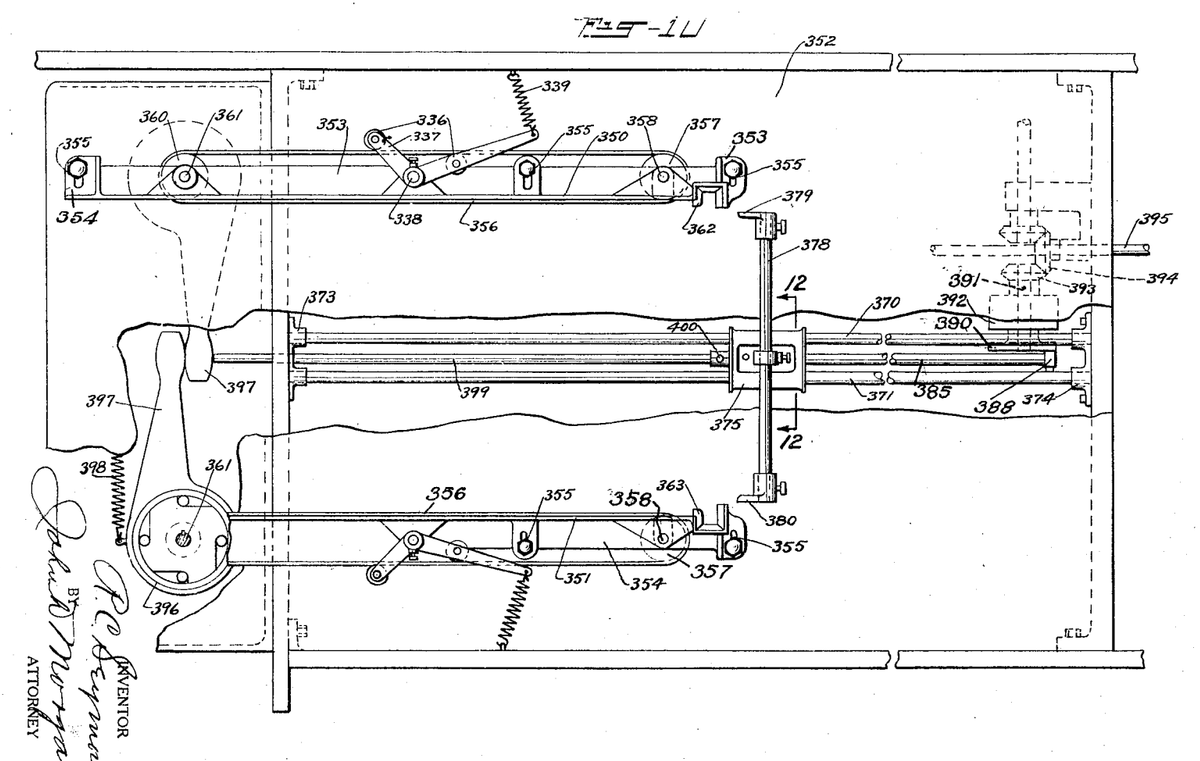
Fig. 11 is an enlarged, sectional, fragmentary detail, taken substantially on the line 11—11 of Fig. 9.
Figure 12:
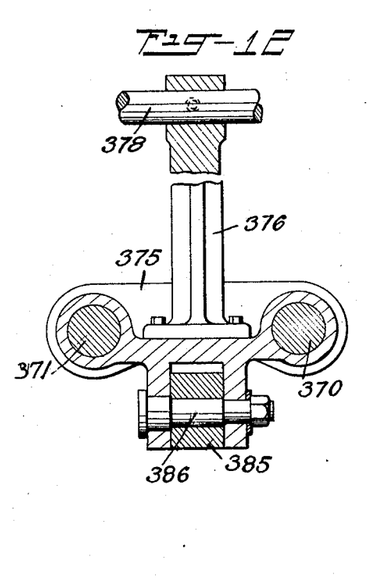
Fig. 12 is an enlarged, fragmentary, sectional detail taken substantially on the line 12—12 of Fig. 10.

The sheet or group of sheets, slitted into three groups, is conveyed away along a flat path, the central group being conveyed by the rollers 238, 239 and 240, whose shafts are gear driven as hereinbefore described, the sheet or sheets passing under the friction rollers 290 and 291, and being delivered to the folding rollers 320 and 321 (Figs. 6, 6ª, 7 and 9), where the folding blade 340 tucks the sheet or sheets into the bite of the folding rollers.

The new folded signatures are received from the folding rollers 320 and 321 between the guides 362 and 363 to the delivering and packing box, the pusher fingers 379 and 380 engaging the successively delivered folded signatures and pushing them gently until their ends are engaged with the endless belts 356, which are intermittently driven through the ball clutches 396 to deliver the folded and packed signatures along the packing box.

From all the foregoing it will be understood that a mechanism has been provided constituting an exemplary embodiment of the invention, and realizing the objects and advantages herein set forth, together with other objects and advantages. It will be understood further that departures may be made from the exact mechanism as shown and described, within the scope of the accompanying claims, without departing from the principles of the invention and without sacrificing its chief advantages.

What I claim is:—

1. A folding machine including in combination sheet supplying means, a rotating carrier having a folding jaw and a folding blade, a rotating carrier for taking the sheet from said folding jaw by the fold and having a folding jaw alternatively cooperating with the folding blade to take the once folded sheet by making a second fold therein, means for removing the second named carrier, and longitudinal folding means alternatively operable when said second named carrier is removed.

2. A folding machine including in combination sheet supplying means, a rotating carrier having a folding jaw and a folding blade, a rotating carrier for taking the sheet from said folding jaw by the fold and having a folding jaw alternatively cooperating with the folding blade to take the once folded sheet by making a second fold therein, and means for removing said second carrier from operative relation with said first-mentioned carrier.

3. A folding machine including in combination sheet supplying means, means for folding the sheet and means for taking the sheet therefrom, means for removing said sheet taking means from operative relation with the folding means, other means for folding the sheet when said sheet taking means is out of said operative relation, and other means including a rotating carrier having grippers and folding mechanism associated therewith for taking and folding the sheet when said second carrier is out of said operative relation.

4. A folding machine including in combination sheet supplying means, means for folding the sheet, means for taking the sheet therefrom, means for removing said sheet taking means from operative relation with the folding means, other means for folding the sheet when said sheet taking means is out of said operative relation, and other means including a rotating carrier having grippers and longitudinal folding mechanism associated therewith for taking and longitudinally folding the sheet when said second carrier is out of said operative relation.

5. A folding machine including, in combination, sheet supplying means, mechanism for folding a sheet including a pair of rotatable sheet carrying folding members successively gripping the sheet, and a plurality of alternatively rotating carriers, cooperating alternatively with said folding mechanism to fold the sheet transversely or transfer it to longitudinal folding means associated therewith.

6. A folding machine including, in combination, sheet supplying means, mechanism for folding a sheet including a pair of rotatable sheet carrying folding members successively gripping the sheet, and a plurality of alternatively rotating carriers, cooperating alternatively with said folding mechanism to either grip the sheet without folding, or fold the sheet once.

7. A folding machine including, in combination, sheet supplying means, mechanism for folding a sheet including a pair of rotatable sheet carrying folding members successively gripping the sheet, and a plurality of alternatively rotating carriers cooperating alternatively with said folding mechanism, one of said carriers having means for gripping the sheet without folding or folding it again, and the other having means for taking the sheet without folding and folding mechanism associated therewith.

8. A folding machine including, in combination, sheet supplying means, mechanism for folding a sheet including a pair of rotatable sheet carrying folding members successively gripping the sheet, and a plurality of alternatively rotating carriers cooperating alternatively with said folding mechanism, one of said carriers having means for gripping the sheet without folding or folding it again transversely, and the other having means for taking the sheet without folding and folding mechanism associated therewith.

9. A folding machine including, in combination, sheet supplying means, mechanism for folding a sheet including a pair of rotatable sheet carrying folding members successively gripping the sheet, and a plurality of alternatively rotating carriers cooperating alternatively with said folding mechanism, one of said carriers having means for gripping the sheet without folding or folding it again transversely, and the other having means for taking the sheet without folding and longitudinal folding mechanism associated therewith.

10. A folding machine including, in combination, sheet supplying means, means for folding the sheet comprising a pair of rotating carriers successively engaging the sheet, means including a rotating member provided with grippers for taking the sheet from the second sheet engaging carrier by the fold, means for removing said sheet taking means from operative relation with the folding means, and other means for folding the sheet when said sheet taking means is out of said operative relation.

11. A folding machine including, in combination, sheet supplying means, means for folding the sheet comprising a pair of rotating carriers successively engaging the sheet, means including a rotating member provided with grippers and also with folding jaws for taking the sheet from the second sheet engaging carrier by making another fold therein, means for removing said sheet taking means from operative relation with the folding means, and other means for folding the sheet when said sheet taking means is out of said operative relation.

12. A folding machine including, in combination, sheet supplying means, means for folding the sheet comprising a pair of rotating carriers successively engaging the sheet, means including a rotating member provided with grippers and also with folding jaws for taking the sheet from the second sheet engaging carrier by making a cross fold therein, means for removing said sheet taking means from operative relation with the folding means, and other means for folding the sheet when said sheet taking means is out of said operative relation.

13. A folding machine including, in combination, sheet supplying means, means for folding the sheet comprising a pair of rotating carriers successively engaging the sheet, means including a rotating member provided with grippers for taking the sheet from the second sheet engaging carrier by the fold, means for removing said sheet taking means from operative relation with the folding means, and other means for longitudinally folding the sheet when said sheet taking means is out of said operative relation.

14. A folding machine including, in combination, sheet supplying means, a cylinder having grippers and a folding blade, a rotating carrier having folding jaws and an alternatively usable folding blade, and a pair of carriers alternatively cooperable therewith, one having grippers and alternatively usable folding jaws, and the other having grippers, and folding means associated with said last named carrier.

15. A folding machine including, in combination, sheet supplying means, a cylinder having a folding blade and grippers for taking the sheet from the sheet supplying means, a cylinder having a folding blade and folding jaws for taking the sheet from said first named cylinder, an alternatively cooperating cylinder having grippers, and folding means associated therewith.

16. A folding machine including, in combination, sheet supplying means, a cylinder having a folding blade and grippers for taking the sheet from the sheet supplying means, a cylinder having a folding blade and folding jaws for taking the sheet from said first named cylinder, an alternatively cooperating cylinder having grippers, and longitudinal folding means associated therewith.

17. A folding machine including, in combination, sheet supplying means, a cylinder having a folding blade and grippers for taking the sheet from the sheet supplying means, a cylinder having a folding blade and folding jaws for taking the sheet from said first named cylinder, an alternatively cooperating cylinder having grippers, and a flat folder associated therewith.

18. A folding machine including in combination sheet-gripping means optionally operable to advance one or more sheets, a member cooperating therewith to make a fold in the sheet or group of sheets advanced, a sheet carrying cylinder for taking the sheet or group of sheets from said cooperating member, and means for bodily removing the cylinder from operative relation with said folding means.

19. A folding mechanism including in combination sheet supplying means, means for making a fold in a sheet advanced by the supplying means, a sheet gripping member for taking the sheet from the folding means either as folded or by making another fold therein, and additional means for alternatively transferring the folded sheet to longitudinal folding mechanism associated therewith.

20. A folding mechanism including in combination sheet supplying means, means cooperating with the supplying means for making a fold in a sheet advanced by the supplying means, a sheet gripping member for taking the sheet from the folding means either by the fold or by making another fold therein, and additional means for alternatively transferring the folded sheet to longitudinal folding mechanism associated therewith.

21. A folding mechanism including in combination means optionally operable to advance one or more sheets, a member cooperating therewith to make a fold in the sheet or group of sheets advanced, a sheet gripping member for taking the sheet or group of sheets from said cooperating folding member either by the fold or by making another cross fold therein, and a third alternative mechanism for alternatively transferring the folded sheet to longitudinal folding mechanism associated therewith.

In testimony whereof, I have signed my name to this specification.

RALPH C. SEYMOUR.